Patented July 23, 1946

2,404,426

UNITED STATES PATENT OFFICE 2,404,426

SURFACE CHARACTERISTICS OF SOLID ORGANIC POLYMERS

Max Fredrick Bechtold and Paul Swithin Pinkney, Wilmington, Del., assignors to E. I. du Pont de Nemours & Company, Wilmington, Del., a corporation of Delaware No Drawing. Application July 15, 1944, Serial No. 545,196

11 Claims. (Cl. 117—121)

This invention relates to an improvement in the surface characteristics of solid organic polymers and, more particularly, to increasing the scratch resistance and decreasing the tackiness of the surface of solid organic polymers by depositing a film thereon from polysilicic acid ester solutions. This application is a continuation-in-part of application Serial No. 484,062, filed April 22, 1943, and now abandoned.

Application Serial No. 507,591, filed October 25, 1943, in the name of M. F. Bechtold and entitled "Coated methyl methacrylate polymer" is also a continuation-in-part of application Serial No. 484,062 and relates more specifically to scratch resistant and weather resistant coatings for methyl methacrylate polymer.

Heretofore methods have been proposed for improving the surface characteristics such as the scratch resistance, of solid organic polymers, particularly transparent polymeric materials. One method has involved the vaporization of silica at low pressures followed by condensation on the polymer surface to form a coating said to have improved resistance to scratching. A second method has depended on the incorporation of a solid, insoluble material such as amorphous diatomaceous silica on the surface of the polymer to render it less tacky. The first of these methods requires elaborate equipment and the process is costly and inconvenient to operate on a commercial scale. The second method is unsatisfactory for use with transparent polymers because the insoluble material detracts from the clarity, gloss, and brilliance of the surface.

An object of the present invention is to provide a convenient, economical method of treating the surfaces of solid organic polymers to improve their scratch resistance, decrease their tackiness, and reduce their tendency to collect dust, all without detracting from their gloss, brilliance, and clarity. A more particular object is to provide such a method suitable for treatment of transparent, solid organic polymers. A further object is to provide solid organic polymers with improved scratch resistance and non-tacky surfaces. A still further and more specific object is to provide transparent methyl methacrylate polymer with an improved surface characterized by its scratch resistance and yet at least equal to the uncoated polymer with respect to clarity and brilliance. A further object is to provide on solid organic polymers and the like glossy, colored coatings which are highly resistant to chipping or cracking with rough usage. Other objects will be apparent from the description of the invention given hereinafter.

The above objects are accomplished according to the present invention by coating the surface of a solid organic polymer with a solution comprising an acid polysilicic acid ester and a volatile organic solvent therefor. The term "acid polysilicic acid ester" is used herein in its normal meaning to denote an ester of a polymeric silicic acid, which ester contains —OH groups attached to Si. Polysilicic acid and esters thereof are characterized by containing

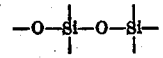

groups.

More particularly the invention is carried out by applying to the surfaces of the solid organic polymer the solution of an acid polysilicic acid ester in a volatile organic solvent, in a thin uniform film, allowing the solvent to evaporate, and then baking the coated surface at an elevated temperature usually not exceeding the softening point of the organic polymer, temperatures of about 75° C. to 100° C. generally being satisfactory; by the use of certain expedients considerably higher temperatures may be used with success. The coating composition may advantageously contain an organic liquid which is a solvent for the organic polymer being treated, in addition to the volatile organic solvent for the polysilicic acid ester, and from 5% to 25%, by weight of the combined $SiO_2$, of an organic polymer which is compatible with the polysilicic acid ester in the solvent-free film.

The specific choice of solvent, film-modifying resin and relative proportions of the components of the coating composition, as well as the conditions of application, depend, as explained hereinafter, on the degree of esterification and polymerization of the acid polysilicic acid ester, the nature of the esterifying alcohol, the resin being coated, and the effects desired. When the invention is properly carried out, a uniform, clear, transparent, glossy polysilicate film is obtained or, if a dye is included, a glossy, colored film is obtained.

Specific embodiments of the invention are illustrated in the following examples wherein all parts are by weight unless otherwise specified.

Example I

A predominantly n-butanol solution of polysilicic acid partially esterified with n-butanol is prepared as follows. An aqueous solution of polysilicic acid is prepared by adding 900 parts of a 15.5% solution of sodium silicate ($SiO_2:Na_2O=3.25:1$ by weight)

to 860 parts of a vigorously stirred solution of 7% sulfuric acid over a period of ten minutes. To the resulting solution, 196 parts of tributyl phosphate and 460 parts of sodium chloride are added. Stirring is continued for one hour and then the mixture is allowed to stand for one hour. The upper, tributyl phosphate layer is separated, centrifuged, and dried over anhydrous sodium sulfate. The resulting clear tributyl phosphate solution contains 16.5% $SiO_2$ as n-butyl acid polysilicate of a relatively low degree of esterification. To 1 volume of this solution are added rapidly and with stirring 1 volume of methanol and 2.5 volumes of benzene. The methanol solution of partially esterified polysilicic acid which separates as a lower layer when the mixture is allowed to stand for fifteen minutes contains 50% to 60% combined $SiO_2$. It is separated and dissolved in n-butanol. The final solution contains 10.4% $SiO_2$ as n-butyl acid polysilicate of a relatively low degree of esterification (0.15 to 0.25 butyl ester group per silicon atom).

A coating solution is prepared by mixing 25 parts of the n-butyl acid polysilicate solution prepared as described above with 2.6 parts of a 15% solution of polyvinyl butyral resin (10% hydroxyl) in butanol. The resulting solution contains combined $SiO_2$ and polyvinyl butyral resin in a ratio of 87:13. It is flowed on a portion of one surface of a sample of each of the polymeric materials listed below. The sample is held with the coated surface in a vertical position to permit the excess solution to run off. The coating is allowed to dry at room temperature and is examined after twenty-four hours. The relative scratch resistance of the coated portion of a surface is determined by wiping the whole surface several times with cheesecloth on which dry Bon Ami, (a cleansing powder commonly used for cleaning glass surfaces), has been placed, and comparing qualitatively the numbers and depth of scratches in the coated and uncoated portions of the surface.

It was found that the coating on each of the polymeric materials listed below gave a surface which was markedly superior to the uncoated surface in resistance to scratching and, in some instances, possessed improved slip characteristics:

Cast methyl methacrylate polymer sheeting.
Vinyl chloride/vinyl acetate interpolymer film (95:5).
Vinyl chloride/diethyl fumarate interpolymer film (86:14).
Polyvinyl chloride film.
Ethylene polymer film.
Ethylene/vinyl acetate interpolymer film (8:1).
Polystyrene injection molded bar.
Polyvinyl butyrate resin film (10% hydroxyl).
Polyvinyl alcohol film plasticized with 15% glycerol.
Neoprene sheeting.
Coated fabric with a topcoat of unvulcanized rubber.
Rubber hydrochloride film.
A film of an interpolymer obtained by interpolymerization of hexamethylene diammonium adipate, hexamethylene diammonium sebacate, and caprolactam.
A film of N-methoxymethylpolyhexamethylene adipamide (10.67% N, 5.85% $CH_3O$).
Cellophane.
Ethyle cellulose film plasticized with 11% dibutyl phthalate.
Cellulose acetate film.
Nitrocellulose film.

*Example 2*

This example shows the coating of a methyl methacrylate polymer with a n-butyl acid polysilicate. Heat is used to accelerate the hardening of the coating.

A portion of one side of a sample of cast methyl methacrylate polymer sheeting is coated with a butanol solution containing 10.5% $SiO_2$ as butyl acid polysilicate. This solution is prepared by the procedure described in Example 1. The coating is allowed to dry for twenty minutes. Then the sample is baked for fifteen minutes at 75° C. The resulting coating is clear and much more resistant to scratching with dry Bon Ami than is the uncoated surface. However, it is slightly crazed and shows some tendency to lose adhesion when wet.

*Example 3*

This example shows the coating of a methyl methacrylate polymer with a tert.-butyl acid polysilicate.

A tert.-butyl alcohol solution of tert.-butyl acid polysilicate is prepared as follows: An aqueous solution of polysilicic acid is prepared by adding 900 parts of a 15.5% solution of sodium silicate ($SiO_2$:$Na_2O$=3.25:1 by weight) to 860 parts of a vigorously stirred solution of 7% sulfuric acid over a period of ten minutes. To the resulting solution 200 parts of tert.-butyl alcohol and 450 parts of sodium chloride are added and the mixture is stirred until the sodium chloride is dissolved (about five minutes). The upper, tert.-butyl alcohol layer which separates when the mixture is allowed to stand for forty-five minutes, is centrifuged to remove occluded water and impurities. The resulting clear, tert.-butyl alcohol solution of tert.-butyl acid polysilicate is dried over anhydrous sodium sulfate. Further esterification is effected by azeotropic distillation of water from the solution, first with tert.-butyl alcohol at a pressure of 75 mm. of mercury and then for about twelve hours with benzene at a pressure of 135 mm. of mercury. During the distillation the solution is not heated above 35° C. The final product, filtered to remove sodium chloride which separates on removal of water from the solution, contains 10.3% $SiO_2$ as tert.-butyl acid polysilicate.

The solution is spread thinly on a portion of one side of a sample of cast methyl methacrylate polymer sheeting and allowed to dry for twenty minutes at room temperature. The resulting clear coating is much more resistant to scratching with dry Bon Ami than is the uncoated surface.

*Example 4*

This example shows the coating of a methyl methacrylate polymer with a tert.-butyl acid polysilicate prepared from silicon tetrachloride and tert.-butyl alcohol.

A tert.-butyl alcohol solution of tert.-butyl acid polysilicate is prepared in the following manner. To 296 parts of tert.-butyl alcohol 42.5 parts of silicon tetrachloride is added over a period of ten minutes with stirring and cooling to keep the temperature of the reaction mixture below 30° C. The mixture is warmed slowly to 65° C., where a vigorous reaction sets in. The tert.-butyl chloride, formed in quantitative yield, is distilled from the reaction mixture together with sufficient tert.-butyl alcohol to leave a solution which, after filtration, contains 12.0% $SiO_2$ as tert.-butyl acid polysilicate.

A portion of one side of a sample of cast methyl methacrylate polymer sheeting is wet with the solution, dried, and baked at 100° C. for fifteen minutes. The resulting clear coating is more resistant to scratching with dry Bon Ami than is the uncoated surface.

Example 5

This example shows the coating of a methyl methacrylate polymer with an ethyl acid polysilicate prepared by partial hydrolysis of tetraethyl silicate.

A coating composition is prepared by mixing 10 parts of tetraethyl silicate, 2 parts of water, 2 parts of ethanol, 15 parts of butanol and a trace of concentrated hydrochloric acid and allowing the solution to stand at room temperature for twenty-four hours. The resulting solution is spread thinly on a portion of one side of a sample of cast methyl methacrylate polymer sheeting. It is dried in three minutes at 75° C. to a clear coating which is much more resistant to scratching with dry Bon Ami than is the uncoated surface.

Example 6

This example shows the coating of a methyl methacrylate polymer with a butyl acid polysilicate from a solution containing toluene in addition to butanol.

A coating composition is prepared by adding 2 parts of toluene to 10 parts of n-butanol solution containing 9.9% $SiO_2$ as n-butyl acid polysilicate prepared by the procedure described in Example 1. The resulting solution is spread thinly on a portion of one side of a sample of cast methyl methacrylate polymer sheeting, dried, and baked for sixteen hours at 75° C. The clear coating is free of craze and is much more resistant to scratching with dry Bon Ami than is the uncoated surface.

Example 7

This example shows the coating of a methyl methacrylate polymer with a butyl polysilicate film containing a polyvinyl butyral resin and, in some cases, a carboxylic acid.

A coating composition is prepared by mixing 10 parts of the n-butyl acid polysilicate solution described in Example 6, 6.67 parts of a 15% solution of a polyvinyl butyral resin (10% hydroxyl) in ethanol, and 8.1 parts of n-butanol. The ratio of polyvinyl butyral resin to combined $SiO_2$ in the solution is 1:1. A portion of one side of a sample of cast methyl methacrylate polymer sheeting is coated with this solution. After forty-three hours at 75° C., the clear, craze-free coating shows improved resistance to scratching with dry Bon Ami in comparison with the uncoated surface. When the ratio of polyvinyl butyral resin to combined $SiO_2$ in the coating solution is lowered to 1:3 and the baking period is reduced to sixteen hours at 75° C., a clear, craze-free coating is obtained which shows a greater improvement in scratch resistance. When the ratio of these ingredients is lowered further to 12.5:87.5 and glacial acetic acid equivalent to 16.7% of the final coating composition is added and the baking period is reduced to one hour at 75° C., a clear, craze-free coating is obtained which shows an even greater improvement in scratch resistance. When the acetic acid in the above coating composition is replaced by isobutyric acid and the sheeting is baked for sixteen hours at 70° C., a clear coating is obtained which shows a still greater improvement in scratch resistance. However, in the last instance the coating and the polymer surface are both slightly cracked.

Example 8

This example shows the coating of a methyl methacrylate polymer with a butyl polysilicate film from a solution containing a polymerizable carboxylic acid.

A coating composition is prepared by mixing 10 parts of the n-butyl acid polysilicate solution described in Example 6 with 1 part of methacrylic acid, 0.0015 part of lauroyl peroxide, and 0.0015 part of benzoin. The resulting solution is spread thinly on a portion of one side of a sample of cast methyl methacrylate polymer sheeting and dried for three hours at 75° C. The resulting clear, craze-free coating is much more scratch resistant than is the uncoated surface. On the other hand, a coating prepared from a similar solution containing no lauroyl peroxide or benzoin is crazed and shows less improvement in scratch resistance.

Example 9

This example shows the coating of a methyl methacrylate polymer with a polyvinyl butyral resin-modified butyl polysilicate film hardened under pressure at a relatively high temperature.

A coating composition is prepared by mixing 10 parts of the n-butyl acid polysilicate solution described in Example 6 with 1 part of a 15% solution of a polyvinyl butyral resin (10% hydroxyl) in ethanol, 1 part of methacrylic acid, and 5 parts of butanol. The ratio of polyvinyl butyral resin to combined $SiO_2$ in the resulting solution is 13:87. The solution is spread thinly on a portion of one side of a sample of cast methyl methacrylate polymer sheeting. After the coating has dried for fifteen minutes at room temperature, it is covered with a smooth glass plate and heated for five minutes at 150° C. to 165° C. under a pressure of 1000 lbs./sq. in. The resulting clear, craze-free coating shows unusually good adhesion to the methyl methacrylate polymer surface and is much more scratch resistant than is the uncoated surface.

Example 10

This example shows the coating of a methyl methacrylate polymer with a polyvinyl butyral resin modified polysilicate film prepared from ethyl silicate.

A coating composition is prepared by mixing 10 parts of the partially hydrolyzed ethyl silicate solution described in Example 5 with 2 parts of a 15% solution of a polyvinyl butyral resin (10% hydroxyl) in ethanol and 5 parts of butanol. The ratio of polyvinyl butyral resin to combined $SiO_2$ in the resulting solution is 23:77. A portion of a sample of cast methyl methacrylate polymer sheeting is dipped in this solution for one minute and dried at room temperature for ten minutes. The sample is baked, first at 75° C. for five hours, and then at 100° C. for sixteen hours. The resulting coating is clear and shows improved scratch resistance in comparison with the uncoated surface.

Example 11

This example shows the coating of a methyl methacrylate polymer with a phenol-formaldehyde resin-modified alkyl polysilicate film prepared from ethyl silicate.

A coating composition is prepared by mixing 10 parts of the partially hydrolyzed ethyl silicate solution described in Example 5 with 1 part of a 50% solution of a diphenyl-olpropane-formaldehyde resin in ethanol. The ratio of phenol-formaldehyde resin to combined $SiO_2$ in the resulting solution is 33.4:66.6. A portion of a sample of cast methyl methacrylate polymer sheeting is dipped in the solution for one minute and dried at room temperature for ten minutes. After six hours at 100° C. the clear, craze-free coating obtained is much more scratch resistant than the uncoated surface.

*Example 12*

By application of the principles of coating solution preparation, application, and curing set forth in the preceding examples, coatings on cast methyl methacrylate polymer sheeting that improve the scratch resistance thereof are obtained from butyl acid polysilicic acid ester solution modified with various organic polymers as given in the following list wherein the ratio indicates the weight ratio of organic polymer to $SiO_2$ and the data in parentheses indicates the duration and temperature of baking after the sheeting is dipped and dried: ethyl methacrylate 16.7:83.3 (4 hours, 100° C.), ethylene/vinyl acetate interpolymer 33.4:66.6 (40 hours, 75° C.), melamine-formaldehyde+alkyl resin 25:75 (16 hours, 100° C.), polyamide resin 10:90 (16 hours, 75° C.), non-drying oil modified glyceryl phthalate resin 37.7:62.3 (64 hours, 75° C.), castor oil 50:50 (16 hours, 100° C.), hydroxyacetic acid modified castor oil 75:25 (22 hours, 100° C.), ethyl cellulose 20:80 (24 hours, 75° C.).

*Example 13*

This example shows the coating of a methyl methacrylate polymer with a polyvinyl acetate (52% hydrolyzed) modified polysilicate film prepared from tetraethyl silicate.

A coating composition is prepared as follows: 100 parts of tetraethyl silicate, 48 parts of ethanol, and 44 parts of 0.1 N hydrochloric acid are mixed with agitation. The mixture is allowed to stand for ninety-two and one-half hours. To 26.7 parts of the resulting solution are added 15.8 parts of ethanol, 37.5 parts of glacial acetic acid, and 20 parts of a solution (5% solids) of a polyvinyl acetate (52% hydrolyzed) in a 70/30 ethanol/water mixture.

A sample of cast methyl methacrylate polymer sheeting is immersed in the coating solution for 7.5 minutes, withdrawn, and allowed to dry for twenty minutes in a vertical position in air at room temperature and 27% relative humidity. The coated polymer sheeting is placed between smooth glass plates of the same length and width as the sheeting. This assembly is placed in a closely fitting mold which is inserted between the platens of an hydraulic press. Pressure (1100 lbs./sq. in.) is applied and the platens are heated to 175° C. over a period of fifteen to twenty minutes, maintained at an average temperature of 175° C. for ten minutes, and then cooled to 30° C. over a period of five minutes. Pressure is released and the coated methyl methacrylate polymer sheeting is removed from the mold.

The resulting coated methyl methacrylate polymer sheeting is transparent and weather resistant and shows extremely high resistance to scratching in comparison with uncoated polymer sheeting. It will resist, with little or no scratching, scouring with steel wool, which rapidly abrades the surface of uncoated polymer sheeting.

*Example 14*

This example shows the coating of a methyl methacrylate polymer with a partially hydrolyzed polyvinyl acetate modified polysilicic acid ester composition colored by inclusion of a dye in the coating solution.

The coating composition is prepared as follows: 200 parts of tetraethyl silicate, 144 parts of ethanol, and 40 parts of 0.1 N hydrochloric acid are mixed by stirring, and the mixture is permitted to stand for nine days. 56 parts of the resultant solution are added to 49 parts of a solution containing 3.6 parts of 52%-hydrolyzed high viscosity polyvinyl acetate in 16.7 parts of water and 28.7 parts of ethanol. To this mixture, the solids content of which is calculated to be 70% of silicic acid polymer (computed as $SiO_2$) and 30% of modifying partially hydrolyzed polyvinyl acetate, is added finally 45 parts of glacial acetic acid and 0.6 part of Du Pont Rhodamine B Extra dye, Colour Index No. 749.

A panel of methyl methacrylate polymer sheeting is immersed in the above prepared dyed coating solution for five minutes, then is withdrawn in a vertical direction at the rate of 6 linear inches per minute. The coated panel is then placed in an oven at 90-108° C. and cured for one hour.

Methyl methacrylate polymer coated in this manner has an intensely colored red surface that is more scratch resistant than the base polymer. It withstands rough handling without chipping or cracking and does not lose color when rubbed with a wet white cloth.

*Example 15*

This example illustrates the curing by baking at unusually high temperature a coating of partially hydrolyzed polyvinyl acetate modified polysilicic acid ester on a methyl methacrylate/methacrylic anhydride copolymer.

Tetraethyl silicate (200 parts) is hydrolyzed and polymerized by stirring in 134 parts of ethanol and 50 parts of 0.1 N hydrochloric acid. The coating solution is prepared by mixing the following materials in the amounts and order indicated:

| | Parts |
|---|---|
| A 10% solution of 52%-hydrolyzed viscosity polyvinyl acetate | 30.0 |
| Ethanol | 8.9 |
| The above hydrolyzed ethyl silicate solution used at the age of one day | 60.0 |
| Glacial acetic acid | 51.1 |

A sheet of methyl methacrylate/methacrylic anhydride copolymer (93:7) is immersed in the coating solution (at the age of 2.6 hours) for one minute. The sheet is then withdrawn from the coating solution while in vertical position at the rate of 6 linear inches per minute and transferred immediately to an oven at 148° C. After baking for 45 minutes, the panel is removed and permitted to cool for use.

The resultant coated surface is free of optical defects and has unusually high resistance to scratching when scoured with abrasive powders and with steel wool. In addition, the coated surface is unusually resistant to failure in severe weathering exposures.

The most satisfactory scratch resistant coatings are obtained with coating solutions prepared by hydrolysis of tetraethyl silicate. Best results are obtained when the hydrolysis is carried out with at least 20% of water (based on the weight of tetraethyl silicate) in the presence of a small amount of a strong acid, preferably hydrochloric acid. In order to obtain a coating highly adherent to polymethyl methacrylate, the coating solution should preferably contain from 20% to 45% of glacial acetic acid. Highly scratch resistant coatings having more satisfactory weather resistance are obtained when the coating composition contains partially hydrolyzed polyvinyl acetate or a hydrolyzed ethylene/vinyl acetate (1:3) interpolymer in a ratio of 1 part to from 2 to 6 parts of silica. Optimum coating thickness is obtained most conveniently by use of coating solutions containing from 4% to 8% solids (silica plus modifying resin). The pressing step, when coating polymethyl methacrylate, is carried out preferably at from 125° C. to 180° C. under a pressure of at least 150 lbs./sq. in. between highly polished rigid surfaces which may be of metal or glass.

In general the surface characteristics of any organic polymer can be improved by application thereto of a coating comprising an organic polysilicate from a solution comprising any acid polysilicic acid ester and a volatile solvent.

The term "organic polymer" is used herein to include both natural and synthetic polymeric materials. Organic polymers adapted to be coated by the process of this invention include: cumarone resins; indene resins; acetylene polymers, including their halogenated derivatives; olefin hydrocarbon polymers, including polymers of ethylene and butadiene and their homologs, and halogen substituted derivatives thereof; olefin-sulfur dioxide resins; petroleum resins, including resins formed by oxidation of petroleum and resins formed by reaction of petroleum constituents with such materials as formaldehyde, methylal, metallic halides, sulfur, and sulfur chloride; resinous halogenated petroleum hydrocarbons; resins from halogenated petroleum hydrocarbons; resins from cracked hydrocarbons; polystyrene and polymers from styrene derivatives; phenol-aldehyde resins; aldehyde resins; furufral resins; ketone resins; urea-formaldehyde type resins, including thioureaformaldehyde, melamine-formaldehyde, and dicyandiamide-formaldehyde resins; amine-aldehyde resins; sulfonamide-aldehyde resins; nitro resins; resins from such nitrogen-containing materials as hydrazine and related substances, pyrazoles, pyridine, quinoline, pyrrole, indole, and carbazole; resins from wood and from carbohydrates; natural resins and their esters, including rosin, shellac, and ester gum; condensation polyester resins, including resins obtained from polyhydric alcohols and polybasic acids, and from hydroxy-acids; polyamide resins and derivatives thereof; mixed polyester-polyamide resins; polyether resins; polyvinyl ethers; polyvinyl alcohols; polyvinyl esters, including esters of inorganic acids; polyvinyl acetals; polyacrylic acids, anhydrides, esters, amides, and homologs thereof; rubber and its derivatives, including rubber hydrochloride and halogenated rubber; condensation resins from halogenated compounds; olefin-sulfide resins such as the reaction product of ethylene dichloride and alkali polysulfide; phenol-sulfur and phenol-sulfur chloride resins; sulfur-aromatic amine resins; factice; drying oil resins; cellulose and its derivatives, including Cellophane, cellulose esters, and cellulose ethers; and proteins such as casein, zein, soybean protein, and leather. These may be modified with any of the usual modifying agents including plasticizers, pigments, fillers, dyes, and materials which combine chemically with the polymer ingredients either during formation of the polymer or during an after treatment. Thus, copolymers, interpolymers, and mixtures of polymers can advantageously be coated by the process of this invention. The organic polymer may be in any form including sheet, rod, tube, supported film, unsupported film, molded article, cast article, powder, and the like. The clarity and scratch resistance of the coatings obtainable by the process of this invention are of great advantage when the polymers to which the coating are applied are transparent. However, as shown in Example 14, excellent glossy colored coatings may be produced in which case transparency of the base polymer is not necessarily of especial benefit. The colored coatings are obtained by adding a dye to the coating composition. The dye should preferably be soluble in the coating solution employed, for example, a mixture of alcohol, water and acetic acid. Du Pont fuchsine, concentrated powder, Colour Index 677 is a suitable dye for this purpose.

A solution of an acid polysilicic acid ester in a solvent may also be advantageously applied to glass. In this instance, the hardness of the surface is not improved but the coating deposited tends to reduce the reflection of light by the glass which, in turn, tends to make the glass less visible. The application of the colored solutions to glass is particularly advantageous.

In addition to the acid polysilicic acid esters prepared as described in the examples, acid polysilicic acid esters prepared by any other processes are suitable for use in this invention. These include acid polysilicic acid esters prepared as described in the following references: U. S. Application Serial No. 439,549, filed April 18, 1942, by Joseph S. Kirk; U. S. application Serial No. 439,548, filed April 18, 1942, by Ralph K. Iler and Joseph S. Kirk, also assigned to the assignee of the present application; U. S. Patent 1,809,755; German Patent 568,545 and German Patent 659,814. Suitable solutions can also be made by controlled hydrolysis of ethyl silicate.

The formation of a hard, adherent polysilicate film appears to depend in large part on the ability of acid polysilicic acid esters to polymerize further until a highly polymeric structure results. Therefore it is preferable that the polysilicic acid ester contain free silicic acid hydroxyl groups, which make possible the formation of high polymers through condensation. It may be desirable in some cases to prepare the acid polysilicic acid ester from a neutral polysilicic acid ester in situ by adding a suitable amount of water and a hydrolysis catalyst such as a strong mineral acid to the ester solution just before application.

The acid polysilicic acid esters may vary in molecular weight from esters containing only two silicon atoms per molecule to those whose molecules are of colloidal dimensions and whose sols are approaching the gel state. In general, esters of relatively low molecular weight are preferred since they are more soluble and more compatible with organic materials than are the relatively high molecular weight esters.

The acid polysilicic acid esters may vary also in the ratio of silicic acid ester groups to silicon atoms from 0.01:1 or less to 2:1. Although the solubility of the ester in organic solvents and its compatibility with organic polymers increase with increase in degree of esterification of the polysilicic acid, the ester tends to polymerize more readily at lower temperatures and in a shorter time (i. e., it forms a tack-free, hard film under milder conditions) as the degree of esterification is decreased. In general, the hardness of the coating obtained from an acid polysilicic acid ester solution decreases with increase in the degree of esterification of the polysilicic acid. As illustrated by the above examples, a butyl acid polysilicate in which the ratio of butyl groups to silicon atoms is 0.2:1 forms a hard, scratch resistant coating merely on drying at room temperature. As the ratio of butyl silicate groups to silicon atoms increases to 0.5:1 the film obtained becomes softer; when the ratio reaches 0.8:1, the film (without modification) remains tacky; and when it is 1:1 or greater, the film obtained remains oily unless suitably modified. The preferred ratio of silicic acid ester groups to silicon atoms, depends, of course, on the nature of the ester group, the nature of the polymer surface to be coated, and the characteristics desired in the coating. Acid polysilicic acid esters in which the ratio of silicic acid ester groups to silicon atoms varies from 0.1:1 to 1:1 include those useful in most polymer-coating applications. Butyl acid polysilicates containing from 0.1 to 0.3 butyl silicate groups per silicon atom and ethyl acid polysilicates containing from 0.1 to 0.7 ethyl silicate groups per silicon atom are among the preferred polysilicic acid esters for use in improving the scratch resistance of polymeric materials. The optimum degree of esterification for each particular application can readily be determined by a few preliminary tests.

The alcohol from which the acid polysilicic acid ester is derived may be primary, secondary, or tertiary, aliphatic or aromatic, cyclic or alicyclic, mono- or polyhydric, saturated or unsaturated, and straight chain or branched chain. It may contain additional functional groups provided such groups do not affect the stability of the ester. Suitable functional groups include ether, halide, mercaptan, sulfide, ketone, ester, amide, nitro, and nitrile groups. In some cases acid polysilicic acid esters containing such groups may be superior to unsubstituted esters in solubility in certain organic solvents and compatibility with certain polymers. The alcohol from which the acid polysilicic acid ester is derived may vary in chain length from 1 to 12 or more carbon atoms.

In general the solubility of acid polysilicic acid esters in solvents in which the ratio of carbon to oxygen is high (e. g., long-chain alcohols and esters, hydrocarbons, and halogenated hydrocarbons), the compatibility of acid polysilicic acid esters with polymeric materials in which the ratio of carbon to oxygen is high, and the softness of coatings obtained from these esters appear to increase with increase in the ratio of carbon to silicon in the acid polysilicic acid ester. Thus, given a definite ratio of silicic acid ester groups to silicon atoms, the preference as to which particular acid polysilicic acid ester to use in a given application depends on the polymer to be coated and the characteristics desired in the coating. In the coating of methyl methacrylate polymer to improve its scratch resistance, acid polysilicic acid esters derived from alcohols containing less than six carbon atoms per molecule are preferred. Coatings with improved scratch resistance can be obtained from longer chain esters of very low degree of esterification. However, the lower stability of such esters detracts from their utility.

The choice of the solvent from which the acid polysilicic acid ester is applied depends on a number of variables. One is the solubility of the acid polysilicic acid ester, which varies, as pointed out above, with degree of esterification, nature of esterifying group, and molecular weight. The ester should, of course, be soluble in the solvent used. Another variable is the solubility of the polymer being coated. It is preferable to include in the acid polysilicic acid ester solution a liquid which will soften, or even better, dissolve the surface polymer. Improved anchorage of the highly polymeric silicic acid ester coating to the polymer surface is often obtained in this way. Organic polymers vary widely, of course, in their solubilities, but in most cases suitable solvents or swelling agents are well known to those who are at all familiar with the resin field. In many cases a mixture of solvents including both a relatively volatile liquid and a less volatile solvent for the organic polymer is preferable. Acid polysilicic acid ester and organic polymer solvents useful in this application include alcohols, ketones, esters of organic or inorganic acids, ethers, amides, and acids. In general, it is preferable to include in the solvent composition at least 20% of an alcohol of the group consisting of ethyl, propyl, and butyl alcohols. In the coating of methyl methacrylate polymer good adhesion of the polysilicate film to the polymer, particularly on immersion in water, is promoted by including in the solvent composition 1 to 50% of a carboxylic acid containing 2, 3, 4, or 5 carbon atoms per molecule. Amines are not ordinarily suitable as constituents of the coating composition since they cause rapid gelation of acid polysilicic acid esters.

In many cases the desired change in surface characteristics can be obtained more satisfactorily if a suitable organic polymer is included in the coating composition. In general, the hardness and scratch resistance of the resulting coating are intermediate between those of the modifying polymer and an unmodified polysilicate coating. The modifying polymer must be soluble in the solvent composition used and is preferably compatible with the acid polysilicic acid ester both in the coating solution and in the solvent-free film. The compatibility of a particular organic polymer with an acid polysilicic acid ester depends, as indicated above, on the ratio of silicic acid ester groups to silicon atoms, the nature of the esterifying group, and the molecular weight of the acid polysilicic acid ester. The choice of modifying polymer and ratio of modifying polymer to acid polysilicic acid ester in the coating composition depends in each case on the polymer which is being coated, the acid polysilicic acid ester being used, and the characteristics desired in the coating. The modifying polymer content of the coating composition solids may vary from 5% or less to 90% or more. In order to take fuller advantage of the effect of the polysilicate, the modifying polymer content of the coating composition solids is usually limited to 50% and in many cases the best results are obtained by using 30% or less.

A polymer which is insoluble in the preferred acid polysilicic acid ester solvents when completely polymerized may often advantageously be added to the coating composition while it is incompletely polymerized and still soluble, and then polymerized further after application of the coating composition. Examples of polymers which are preferably used in this manner are urea-formaldehyde and phenol-aldehyde type polymers. In some cases it is preferable to add the ingredients of the modifying polymer and a suitable polymerization catalyst to the coating composition and carry out the polymerization either in the coating composition before application, during the evaporation of the solvent from the film, or in the solvent-free film. For example, monomeric or partially polymerized methyl methacrylate can be used in this manner. It is probable that in some cases copolymers involving both the acid polysilicic acid ester and the modifying polymer are formed.

Some of the advantages of including an organic polymer in the coating composition are brought out in the above examples which illustrate the application of polysilicate coatings containing organic polymers to methyl methacrylate polymer sheeting to form a more scratch resistant surface. In this application a polyvinyl butyral resin is particularly useful. This resin decreases the tendency of the coating to crack or craze and improves its flexibility, adhesion to the polymer surface, resistance to deterioration on immersion in water, and outdoor durability.

It may in some cases be desirable to pretreat the polymer surface which is to be coated. Thus it may be softened or even made tacky by use of a solvent or swelling agent before the coating composition is applied. Such pretreatment assists penetration of the acid polysilicic acid ester into the polymer surface and leads to formation of a more adherent coating.

The acid polysilicic acid ester coating composition may be applied in any suitable manner, such as by spraying, dipping, brushing, flowing, or using a doctor knife or applicator roll. Its viscosity can be adjusted to suit the method of application by varying the solids content of the solution. The thickness of the film of ester, modifying polymer, and non-volatile solvent for the polymer being coated can be varied by varying the proportion of volatile solvent and by varying the thickness of the film of coating solution applied. Thus the solids content of the coating solution is governed by the method of application to the polymer surface and the desired film thickness. It may vary from 0.5% or less to 60% or more.

After application of the coating solution to the polymer surface, the volatile solvent is allowed to evaporate. The time required for the evaporation depends, of course, on several factors including the volatility of the solvent, temperature, the circulation of air over the polymer surface, the thickness of the coating applied, and the nature of the modifying polymer in the solution. The rate of polymerization of acid polysilicic acid esters increases as the concentration of ester increases. Accordingly, as solvent evaporates from the coating the acid polysilicic acid ester polymerizes more and more rapidly. The rate of polymerization increases also with rise in temperature. Thus, while it may take several hours for an acid polysilicic acid ester in which the ratio of silicic acid ester groups to silicon atoms is low (0.25 or less to 1) to polymerize to a hard, scratch resistant film at room temperature, polymerization is usually relatively complete within a few minutes at higher temperatures (100° C. to 150° C.). A curing period of one minute to twenty-four hours at temperatures varying from 25° C. to 150° C. is normally sufficient to produce the desired effect.

In addition to increasing the rate of polymerization, it has been found that the scratch resistance and exposure resistance of acid polysilicic acid esters—hydroxylated organic polymer coatings baked on plastics increases appreciably with increasing curing temperatures. However, the temperature at which the coatings can be baked is limited by the softening temperature of the polymer being coated. This is especially true of the thermoplastic resins such as methyl methacrylate polymer and polystyrene which tend to give cracked surfaces when high temperature curing of the coatings is attempted. It has now been discovered that high temperature curing of acid polysilicic acid ester containing coatings can be performed successfully on the vinyl polymers if the polymer is modified by copolymerization with a relatively small amount of bifunctional or polyfunctional cross linking agent. For example, the addition of 7 parts of methacrylic anhydride to 93 parts of methyl methacrylate in a casting syrup will yield a high softening point cast sheet resistant to cracking during the curing of coatings at unusually high temperatures around 150° C. In the case of styrene, a copolymer with 2%–4%, by weight of the copolymer, of methacrylic anhydride is more suitable than unmodified polystyrene as a base material for the high temperature curing of the coatings.

In some cases improved adhesion of the polysilicate coating to the surface of the organic polymer can be obtained by placing a smooth plate, such as a piece of plate glass, over the coating after evaporation of the volatile solvent and pressing the plate against the surface during the heating step. This technique permits use of higher baking temperatures (up to 200° C. or 250° C.) without deformation of the polymer surface.

There is evidence indicating that when the modifying organic polymer in the coating solutition contains free alcohol hydroxyl groups, reaction takes place during baking between the polymer and the acid polysilicic acid ester. The reaction probably involves either direct esterification (reaction between an alcohol hydroxyl group of the polymer and a silicic acid hydroxyl group with formation of a molecule of water) or ester interchange (reaction between an alcohol hydroxyl group of the polymer and a silicic acid ester group with formation of a molecule of the alcohol from which the silicic acid ester is derived). A crosslinking reaction of this type could conceivably take place between an acid polysilicic acid ester and any organic polymers which ordinarily contain free alcohol hydroxyl groups, such as polyvinyl alcohols, polyvinyl acetals, cellulose ethers and esters, nitrocellulose, condensation polyesters, and any other types of polymers prepared from ingredients containing free alcohol hydroxyl groups not involved in formation of the polymer. The effect of this reaction is to reduce the solubility of the modifying polymer and increase the hardness of the film obtained. Usually, particularly when the degree of esterification of the acid polysilicic acid ester is relatively high and the alcohol from which the ester is derived has a boiling point above about 80° C., it is necessary to bake the film at temperatures of 80° C. to 200° C. for fifteen minutes to two hours to promote the crosslinking reaction to the fullest extent. It is possible that a reaction of this type is involved in the formation of a strong bond between a polysilicate coating and the surface of a polymer which contains alcohol hydroxyl groups.

The extent to which an acid polysilicic acid ester polymerizes on heating depends on the extent to which it is esterified (the ratio of silicic acid ester groups to silicon atoms). If, as pointed out above, the degree of esterification is low, the film obtained is usually very hard and the hardness decreases as the degree of esterification increases. The silicic acid esters of lower alcohols, such as methanol or ethanol, are more easily hydrolyzed by moisture in the atmosphere than are the esters of higher alcohols, such as butanol or octanol. Therefore, the extent of polymerization during drying, baking, or subsequent aging increases more in the cases of the methyl and ethyl esters than with the higher esters when these operations are carried out in an atmosphere containing appreciable amounts of moisture. Since amines accelerate both hydrolysis of silicic acid esters and polymerization of silicic acid, rapid formation of a highly polymerized polysilicate coating may be promoted by carrying out the drying, baking, or aging operations in a moist atmosphere containing an amine such as ammonia or by flushing the dry, coated surface with an aqueous solution of an amine.

Through use of this invention the surface characteristics of solid organic polymeric materials are changed to enhance the utility of the polymeric materials in a given application. The invention is particularly useful for improving the serviceability of transparent plastic materials through application to the surface of the plastic a clear, transparent coating which is more resistant to marring and scratching than is the uncoated surface. The invention is also useful for decreasing the tackiness of polymer surfaces, particularly at elevated temperatures, decreasing the tendency of polymer surfaces to collect dust, and decreasing the reflection of light from the surfaces of transparent plastic materials. Further, the invention is adapted to provide glossy, colored coatings, both scratch resistant and exposure resistant, on organic polymeric materials and on glass.

Plastics coated in accordance with this invention show a reduced tendency to acquire a static charge and, therefore, are highly useful in enclosing and panelling instruments subject to static aberration, for example, galvanometers, volt meters, aircraft instruments, and the like.

As many apparently widely different embodiments of this invention may be made without departing from the spirit and scope thereof, it is to be understood that the invention is not limited to the specific embodiments thereof except as defined in the appended claims.

We claim:

1. A solid organic polymer having a surface film thereon obtained by coating a surface of the polymer with an acid polysilicic acid ester of an alcohol containing from 1 to 12 carbon atoms, inclusive, said ester having from .01 to 2.0 silicic acid ester groups per silicon atom, dissolved in a volatile organic solvent.

2. A transparent, solid organic polymer having a surface film thereon obtained by coating a surface of the polymer with a butyl acid polysilicate containing from 0.1 to 0.3 butyl silicate groups per silicon atom, dissolved in a volatile organic solvent.

3. A transparent, solid organic polymer having a surface film thereon obtained by coating a surface of the polymer with a coating solution comprising an acid polysilicic acid ester of an alcohol containing from 1 to 12 carbon atoms, inclusive, said ester having from .01 to 2.0 silicic acid ester groups per silicon atom, and an organic polymeric material compatible with said ester in the solvent-free film, dissolved in a volatile organic solvent.

4. A solid organic polymer having a surface film thereon obtained by coating a surface of the polymer with a coating solution comprising an acid polysilicic acid ester of an alcohol containing from 1 to 12 carbon atoms, inclusive, said ester having from .01 to 2.0 silicic acid ester groups per silicon atom, and an organic solvent for said polymer whose surface is being coated.

5. A solid organic polymer having a surface film thereon obtained by coating a surface of the polymer with a coating solution comprising an acid polysilicic acid ester of an alcohol containing from 1 to 12 carbon atoms, inclusive, said ester having from .01 to 2.0 silicic acid ester groups per silicon atom, an organic polymeric material compatible with said ester in the solvent-free film, and an organic solvent for said polymer whose surface is being coated.

6. A solid organic polymer having a surface film thereon obtained by coating a surface of the polymer with a coating solution comprising an acid polysilicic acid ester of an alcohol containing from 1 to 12 carbon atoms, inclusive, said ester having from .01 to 2.0 silicic acid ester groups per silicon atom, and a polymer containing hydroxyl groups, dissolved in a volatile organic solvent.

7. A transparent, solid organic polymer from the group consisting of polyacrylic esters and polymethylacrylic esters, having a surface film thereon obtained by coating a surface of the polymer with an acid polysilicic acid ester of an alcohol containing from 1 to 12 carbon atoms, inclusive, said ester containing from 0.1 to 1.0 silicic acid ester groups per silicon atom, dissolved in a volatile organic solvent.

8. Process of providing a solid organic polymer with improved surface characteristics which comprises coating a surface of the polymer with an acid polysilicic acid ester of an alcohol containing from 1 to 12 carbon atoms, inclusive, said ester having from .01 to 2.0 silicic acid ester groups per silicon atom, dissolved in a volatile organic solvent and drying said coating.

9. Process of providing a solid organic polymer with improved surface characteristics which comprises coating a surface of the polymer with an acid polysilicic acid ester of an alcohol containing from 1 to 12 carbon atoms, inclusive, said ester having from .01 to 2.0 silicic acid ester groups per silicon atom, dissolved in a volatile organic solvent, drying said coating at approximately room temperature and, thereafter, baking said coating at an elevated temperature.

10. Process of providing a solid organic polymer with improved surface characteristics which comprises coating a surface of the polymer with a butyl acid polysilicate containing from 0.1 to 0.3 butyl silicate groups per silicon atom, dissolved in a volatile organic solvent, drying said coating at approximately room temperature and, thereafter, baking said coating at an elevated temperature not in excess of the softening point of said polymer.

11. Process of providing a solid organic polymer with improved surface characteristics which comprises coating a surface of the polymer with a coating solution comprising an acid polysilicic acid ester of an alcohol containing from 1 to 12 carbon atoms, inclusive, said ester having from .01 to 2.0 silicic acid ester groups per silicon atom, a polymer containing hydroxyl groups, and a volatile organic solvent, drying said coating at approximately room temperature and, thereafter, baking said coating at an elevated temperature.

MAX FREDRICK BECHTOLD.
PAUL SWITHIN PINKNEY.

Certificate of Correction

Patent No. 2,404,426. July 23, 1946.

MAX FREDRICK BECHTOLD ET AL.

It is hereby certified that errors appear in the printed specification of the above numbered patent requiring correction as follows: Column 8, line 43, after "hydrolyzed" insert *high*; column 9, line 38, for "furufral" read *furfural*; column 14, line 31, for the syllable "tition" read *tion*; and that the said Letters Patent should be read with these corrections therein that same may conform to the record of the case in the Patent Office.

Signed and sealed this 8th day of October, A. D. 1946.

[SEAL]

LESLIE FRAZER.
*First Assistant Commissioner of Patents.*

Certificate of Correction

Patent No. 2,404,426. July 23, 1946.

MAX FREDRICK BECHTOLD ET AL.

It is hereby certified that error appears in the printed specification of the above numbered patent requiring correction as follows: Column 7, line 24, Example 12, for "alkyl" read *alkyd*; and that the said Letters Patent should be read with this correction therein that the same may conform to the record of the case in the Patent Office.

Signed and sealed this 13th day of May, A. D. 1947.

[SEAL]

LESLIE FRAZER.
*First Assistant Commissioner of Patents.*